(12) United States Patent
Sato et al.

(10) Patent No.: US 8,471,970 B2
(45) Date of Patent: Jun. 25, 2013

(54) LIQUID CRYSTAL DISPLAY AND OPERATION METHOD THEREOF

(75) Inventors: Osamu Sato, Tokyo (JP); Masatoshi Tokita, Tokyo (JP); Junji Watanabe, Tokyo (KR)

(73) Assignees: LG Display Co., Ltd, Seoul (KR); Tokyo Institute of Technology, Tokyo (JP)

( * ) Notice: Subject to any disclaimer, the term of this patent is extended or adjusted under 35 U.S.C. 154(b) by 169 days.

(21) Appl. No.: 13/116,733

(22) Filed: May 26, 2011

(65) Prior Publication Data

US 2011/0292310 A1  Dec. 1, 2011

(30) Foreign Application Priority Data

May 27, 2010  (JP) ................................. 2010-121210

(51) Int. Cl.
*G02F 1/133* (2006.01)
(52) U.S. Cl.
USPC .............................. 349/20; 349/127; 349/187
(58) Field of Classification Search
None
See application file for complete search history.

(56) References Cited

U.S. PATENT DOCUMENTS

| 5,178,571 A * | 1/1993 | Mase ............................... 445/24 |
| 5,235,445 A * | 8/1993 | Hirai et al. ....................... 349/89 |
| 6,307,610 B1 * | 10/2001 | Jones ............................. 349/133 |
| 6,512,085 B1 * | 1/2003 | Minabe et al. ................. 528/480 |
| 2009/0147200 A1 * | 6/2009 | Okuyama et al. ............. 349/127 |

FOREIGN PATENT DOCUMENTS

| JP | 2006-003840 A | 1/2006 |
| KR | 10-0210376 B1 | 7/1999 |
| KR | 10-2007-0002677 A | 1/2007 |

* cited by examiner

*Primary Examiner* — Lucy Chien
(74) *Attorney, Agent, or Firm* — McKenna Long & Aldridge, LLP (57) ABSTRACT

Disclosed is a liquid crystal display device to display moving and still images with superior image quality, comparable to common LCDs and to display memory images by a voltage lower than conventional electronic paper, and a method for operating the same. The liquid crystal display device comprises: a pair of electrode substrates facing each other; an orientation film of a polymer material on the pair of electrode substrates; a liquid crystal material between the pair of electrode substrates, wherein the liquid crystal display device displays an image by varying orientation of the liquid crystal material and a surfacial region of the orientation film, depending on temperature and voltage.

20 Claims, 9 Drawing Sheets

Original orientation direction of liquid crystal material

LIQUID CRYSTAL DISPLAY AND OPERATION METHOD THEREOF

This application claims the benefit of Japanese Patent Application No. 2010-121210, filed on May 27, 2010, which is hereby incorporated by reference as if fully set forth herein.

BACKGROUND OF THE INVENTION

1. Field of the Invention

The present invention relates to a liquid crystal display device and an operation method thereof. In particular, the present invention relates to a liquid crystal display device to display moving images, still images and memory images and an operation method thereof.

2. Discussion of the Related Art

In general, displays such as liquid crystal displays (LCDs), plasma display panels (PDPs) and cathode ray tubes (CRTs) can display both moving images and still images. Continuous supply of voltage is required in order to display still images as well as moving images. Such a display has a disadvantage of power consumption to drive still images, when it displays still images.

Meanwhile, commercially available electronic paper (E-paper) such as electrophoretic, cholesteric liquid crystal and electronic liquid powder types have a consumption power of about 0, when electronic paper displays memory images in order to provide memory property (for example, see Patent Document 1: Japanese Patent Publication No. 2001-83912).

However, since, among representative electronic paper types, the electrophoretic type entails long particle movement time, and cholesteric liquid crystal and electronic liquid powder types have high driving voltage, they can be operated only in a passive mode. For this reason, these electronic paper types have disadvantages of difficulty in displaying moving images.

In addition, all currently available electronic paper has disadvantages of low contrast, long response time due to difficulty in continuous gradation, and thus deterioration in qualities of still and moving images, as compared to LCDs, PDPs and CRTs.

SUMMARY OF THE INVENTION

Accordingly, the present invention is directed to a liquid crystal display device and a method for operating the same that substantially obviate one or more problems due to limitations and disadvantages of the related art.

It is one object of the present invention to provide a liquid crystal display device to display moving and still images with superior image qualities, comparable to common LCDs and to display memory images by a voltage lower than conventional electronic paper, and a method for operating the same.

To achieve the object and other advantages and in accordance with the purpose of the invention, as embodied and broadly described herein, provided is a liquid crystal display device comprising: a pair of electrode substrates facing each other; an orientation films of a polymer material on the pair of electrode substrates; a liquid crystal material between the pair of electrode substrates, wherein the liquid crystal display device displays an image by varying orientation of the liquid crystal material and a surfacial region of the orientation films, depending on temperature and voltage.

The orientation film may be a film obtained by adsorbing a polymeric material dissolved or dispersed in the liquid crystal material on the surface of the substrate, a polymer brush, or a coating.

A surfacial region of the orientation film may be swollen by the liquid crystal material and a glass transition temperature ($T_g$) of the swollen surfacial region of the orientation film may be lower than a temperature ($T_{NI}$) at which the liquid crystal material undergoes phase transition from N phase to I phase.

An initial orientation direction of the swollen surfacial region of the orientation film may be one axis direction or random.

An electrode buried in the electrode substrate may be a comb electrode.

The comb electrode may be paired and the paired comb electrodes may be buried in the electrode substrate such that the paired comb electrodes are substantially symmetrical to each other, based on the initial orientation of the liquid crystal material.

The paired comb electrodes may be separately buried in the pair of electrode substrates, respectively.

The comb electrodes may be buried by interposing an insulating film on only one side of the electrode substrate.

The liquid crystal display device may further include a temperature control unit to heat or cool.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, preferred embodiments of the present invention relating to a liquid crystal display device and a method for operating the same will be described with reference to the annexed drawings. Meanwhile, although an in-plane switching (IPS) mode liquid crystal display device will be described as one example of the present invention, the present invention is not limited thereto and may be applied to vertical orientation mode liquid crystal display devices.

First Embodiment

In the first embodiment, a case in which a polymer brush is used as a polymer material to form an orientation film is described.

Figure 1:
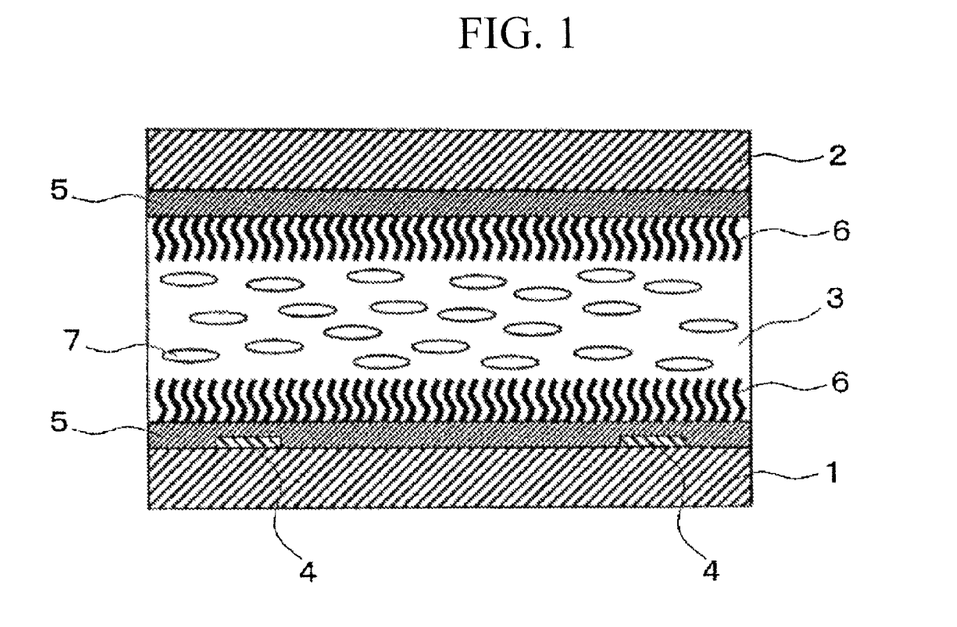
FIG. 1 is a schematic sectional view illustrating a liquid crystal display device according to a first embodiment.

FIG. 1 is a schematic sectional view illustrating a liquid crystal display device according to a first embodiment.

As shown in FIG. 1, the liquid crystal display device of the present invention includes an array substrate 1, an opposite substrate 2 facing the array substrate 1 and a liquid crystal material 3 sealed between the array substrate 1 and the opposite substrate 2.

In addition, an electrode 4, a fixing film 5 and a polymer brush 6 are formed on the array substrate 1 in this order. Also, the fixing film 5 and a polymer brush 6 are formed on the opposite substrate 2 in this order.

The liquid crystal display device having the configuration according to the first embodiment of the present invention basically has the same configuration as a liquid crystal display device well-known in the art, except that the polymer brush 6 is formed as an orientation film. For example, the liquid crystal display device may be formed in accordance with a method well-known in the art, comprising arranging the opposite substrate 2 such that it faces the array substrate 1 provided with the electrode 4 and sealing a liquid crystal material 3 between the array substrate 1 and the opposite substrate 2.

In the first embodiment of the present invention, the polymer brush 6 is a graft polymer chain, one end of which is covalently bonded to the surface of the substrate. The graft polymer chain has a structure in which forms like thread clumps are contracted, when graft density decreases. The graft polymer chain extends vertical to the surface of the substrate due to interaction (steric repulsion) of adjacent graft polymer chains, when graft density increases.

Particularly preferred is the latter structure, that is the structure in which a plurality of graft polymer chains extend vertically to the surface of the array substrate 1 or the opposite substrate 2.

In the first embodiment of the present invention, the term "high density" refers to a density of the graft polymer chains, causing steric repulsion between adjacent graft polymer chains, and is 0.1 chains preferably, 0.1 to 1.2 chains, with respect to a size of 1 $nm^2$ of the surface of the array substrate 1 or the opposite substrate 2.

The polymer brush 6 formed on the surface of the array substrate 1 or the opposite substrate 2 in high density constitutes a layer of a polymer brush (hereinafter, referred to as a "polymer brush layer") on the surface of the array substrate 1 or the opposite substrate 2.

A surficial region of the polymer brush 6 is swollen by the liquid crystal material 3 and the polymer brush 6 has a glass transition temperature ($T_g$) lower than its inherent level at the interface where the polymer brush layer comes into contact with the liquid crystal material 3.

Consequently, the glass transition temperature (Tg) of the swollen region is lower than a temperature ($T_{NI}$) at which the liquid crystal material 3 undergoes phase transition from N phase to I phase.

This state can be accomplished by suitably varying the type of material for the polymer brush 6, the density of the graft polymer chains and the type of liquid crystal used for the liquid crystal material 3.

In conventional LCDs, the liquid crystal material is fixed by the orientation film. Accordingly, when a voltage is applied thereto, liquid crystal present at the interface between the orientation film and the liquid crystal material is fixed and bulk liquid crystal is oriented in an electric field direction (in a direction vertical to an electric field, when Δn is negative (−)), and when an electric field is off, the orientation returns to the original state by elasticity.

In the liquid crystal display device according to the first embodiment of the present invention, when the swollen region of the polymer brush 6 as an orientation film is heated to a temperature of $T_g$ or higher so that it has a glass transition temperature ($T_g$) lower than the temperature at which the liquid crystal material 3 undergoes phase transition from N phase to I phase ($T_{NI}$) and a voltage is applied to the electrode, not only bulk liquid crystal, but also the liquid crystal present at the interface therebetween together with the polymer brush are oriented in the electric field direction.

The polymer brush layer has a thickness of several tens of nanometer (nm), specifically, 10 nm to 100 nm, preferably, 10 nm to 80 nm. This thickness is smaller than the thickness of conventional polyimide orientation films (generally, 100 nm), thus enabling the liquid crystal display device to be driven at a low voltage.

In addition, this polymer brush layer cannot pass through materials with a predetermined size due to size exclusion effects. For this reason, although the thickness of the polymer brush layer decreases, permeation of impurities from lower regions to the liquid crystal material 3 can be prevented.

Furthermore, although the polymer brush layer is relatively thin, orientation can better control orientation of liquid crystal molecules.

The polymer brush 6 can be formed by living radical polymerization of radical polymeric monomers. The term "living radical polymerization" as used herein refers to a polymerization reaction wherein chain transfer reaction and stop reaction do not substantially occur during radical polymerization reaction and chain growth ends maintain activity even after radical polymeric monomers are reacted.

In this polymerization reaction, although polymerization is finished, the formed polymers maintain polymerization activity at the end thereof, and when radical polymeric monomers are added thereto, polymerization can be initiated again.

In addition, in accordance with living radical polymerization, polymers with a predetermined average molecular weight can be synthesized by controlling a concentration ratio between radical polymeric monomers and a polymerization initiator, and the molecular weight distribution of prepared polymers is extremely narrow.

One representative example of living radical polymerization used in the first embodiment of the present invention is atom transfer radical polymerization (ATRP). For example, radical polymeric monomers are subjected to atom transfer living radical polymerization using a copper halide/ligand complex in the presence of a polymerization initiator.

Radical polymeric monomers are added to reversibly grown radicals by extracting the polymer terminal halogen using the copper halide/ligand complex. Molecular weight distribution is restricted by a sufficient frequency of reversible activation/inactivation.

The radical polymeric monomers used for living radical polymerization have unsaturated bonds, enabling radical polymerization in the presence of an organic radical. Examples of radical polymeric monomers include methacrylate monomers such as methyl methacrylate, ethyl methacrylate, propyl methacrylate, n-butyl methacrylate, t-butyl methacrylate, hexyl methacrylate, 2-ethyl hexyl methacrylate, nonyl methacrylate, benzyl methacrylate, cyclo hexyl methacrylate, lauryl methacrylate, n-octyl methacrylate, *2-methoxyethyl methacrylate, butoxy ethyl methacrylate, methoxy tetraethylene glycol methacrylate, 2-hydroxyethyl methacrylate, 2-hydroxypropyl methacrylate, 3-chloro-2-hydroxy propyl methacrylate, tetrahydrofurfuryl methacrylate, 2-hydroxy-3-phenoxy propyl methacrylate, diethyleneglycol methacrylate, polyethylene glycol methacrylate, and 2-(dimethylamino)ethyl methacrylate; acrylate monomers such as methyl acrylate, ethyl acrylate, propyl acrylate, n-butyl acrylate, t-butyl acrylate, hexyl acrylate, 2-ethyl hexyl acrylate, nonyl acrylate, benzyl acrylate, cyclohexyl acrylate, lauryl acrylate, n-octyl acrylate, 2-methoxyethyl acrylate, butoxyethyl acrylate, methoxy tetraethylene glycol acrylate, 2-hydroxyethyl acrylate, 2-hydroxy propyl acrylate, 3-chloro-2-hydroxy propyl acrylate, tetrahydro furfurylfurfuryl acrylate, 2-hydroxy-3-phenoxy propyl acrylate, diethyleneglycol acrylate, polyethylene glycol acrylate, 2-(dimethyl amino) ethyl acrylate, N,N-dimethyl acrylamide, N-methylol acrylamide and N-methylol methacrylamide; and vinyl monomers such as styrene, styrene derivatives (e.g., o-, m- and p-methoxy styrenes, o-, m- and p-t-butoxy styrenes, and o-, m- and p-chloro methyl styrenes), vinyl ester (e.g., vinyl acetate, vinyl propionate, vinyl benzoate), vinyl ketones (e.g., vinyl methyl ketone, vinyl hexyl ketone, methyl isopropyl), N-vinyl compounds (e.g., N-vinyl pyrrolidone, N-vinyl pyrrole, N-vinyl carbazole, and N-vinyl indole), methacrylate derivatives (e.g., acrylonitrile, methacrylonitrile, acrylamide, isopropyl acrylamide, and methacrylamide), and halogenized vinyl (e.g., vinyl chloride, chloride vinylidene, tetrachloro ethylene, hexa chloroprene, fluoride vinyl). These radical polymeric monomers may be used alone or in combination of two or more types.

Any polymerization initiator may be used without particular limitation and may be selected from those generally known in the field of living radical polymerization. Examples of polymerization initiators include benzyl halides such as p-chloromethylstyrene, α-dichloroxylene, α,α-dichloroxylene, α,α-dibromoxylene, hexakis(α-bromomethyl)benzene, benzal chloride (benzalkonium), benzal bromide, 1-bromo-1-phenylethane, 1-chloro-1-phenyl ethane; α-halogenized carbonate such as propyl-2-bromopropionate, methyl-2-chloropropionate, ethyl-2-chloropropionate, methyl-2-bromopropionate, ethyl-2-bromo isobutylate (EBIB); tosyl halide such as p-toluenesulfonyl chloride (TsCl); alkyl halide such as tetrachloro methane, tribromo methane, 1-vinyl ethyl chloride, 1-vinylethyl bromide; and phosphate ester derivatives such as dimethyl phosphate chloride.

Copper halide to render the copper halide/ligand complex is not particularly limited and may be selected from copper halide well-known to be generally used for living radical polymerization. Examples of copper halide include CuBr, CuCl and CuI.

The ligand compound to render the copper halide/ligand complex is not particularly limited and may be selected from ligand compounds well-known to be generally used for living radical polymerization. Examples of ligand compounds include triphenylphosphane, 4,4'-dinonyl-2,2'-dipyridine) (dNbipy), N,N,N',N'N''-pentamethyl diethylene triamine, and 1,1,4,7,10,10-hexamethyl triethylene tetraamine.

The contents of the radical polymeric monomer, polymerization initiator, copper halide and ligand compound may be controlled depending on the type of materials used. The radical polymeric monomer is generally present in an amount of 5 to 10,000 mole, preferably 50 to 5,000 mole, the copper halide is generally present in an amount of 0.1 to 100 mole, preferably 0.5 to 100 mole, and the ligand compound is generally present in an amount of 0.2 to 200 mole, preferably 1.0 to 200 mole, with respect to 1 mole of the polymerization initiator.

Living radical polymerization is commonly performed in absence of a solvent, but may be performed in the presence of a solvent generally used for living radical polymerization. Examples of useful solvents include organic solvents such as benzene, toluene, N,N-dimethylformamide (DMF), dimethyl sulfoxide (DMSO), acetone, chloroform, carbon tetrachloride, tetrahydrofuran (THF), ethyl acetate, trifluoromethyl benzene; aqueous solvents such as water, methanol, ethanol, isopropanol, n-butanol, ethyl cellosolve, butyl cellosolve, and 1-methoxy-2-propanol. The amount of the solvent may be suitably controlled depending on the type of material used, and the amount of the solvent is generally 0.01 to 10 mL, preferably 0.05 to 10 mL, with respect to 1 g of the radical polymeric monomer.

The molecular weight of polymer brush 6 formed by living radical polymerization may be controlled by reaction temperature, reaction time, or the type or amount of materials used, and the polymer brush 6 generally having a number average molecular weight of 500 to 1,000,000, preferably 1,000 to 500,000 can be obtained. In addition, the molecular weight distribution (Mw/Mn) of the polymer brush 6 can be controlled within a range of 1.05 to 1.60. Such a polymer brush 6 enables liquid crystal molecules in the liquid crystal layer to be oriented parallel to the array substrate and the opposite substrate.

If necessary, the polymer brush 6 is formed by interposing the fixing film 5 on the array substrate 1 or the opposite substrate 2 provided with the electrode 4. The fixing film 5 is not particularly limited so long as it is highly adhesive to the array substrate 1, the opposite substrate 2, the electrode 4 and the polymer brush 6 and may be selected from copper halide well-known to be generally used for living radical polymerization. For example, the fixing film 5 is a film made of an alkoxysilane compound represented by the following Formula 1.

(1)

wherein R1 is each independently $C_1$ to $C_3$ alkyl, preferably methyl or ethyl; R2 is each independently methyl or ethyl; X is a halogen atom, preferably Br; and n is an integer of 3 to 10, preferably an integer of 4 to 8.

The fixing film 5 is covalently boned to the polymer brush 6, thus preventing the polymer brush 6 from flowing into the liquid crystal material 3 and improving durability and reliability of the liquid crystal display devices.

The array substrate 1 on which the fixing film 5 is formed is not particularly limited and may be selected from well-known array substrates to be generally used for liquid crystal display devices. For example, the array substrate 1 is an active matrix array substrate. This active matrix array substrate generally has a structure in which gate lines and source lines are arranged in a matrix form on a glass substrate, an active device such as thin film transistor (TFT) is formed on the intersection therebetween, and a pixel electrode is connected to the active device.

The opposite substrate 2 on which the fixing film 5 is formed is not limited and may be selected from generally known liquid crystal display devices. For example, the opposite substrate 2 may be a color filter substrate. Such a color filter substrate is formed by forming a black matrix on a glass substrate to prevent unnecessary leakage of light, patterning color layers including R (red), G (green), B (blue) layers, optionally forming a protective film, and forming an opposite electrode which faces a pixel electrode.

Figure 2:
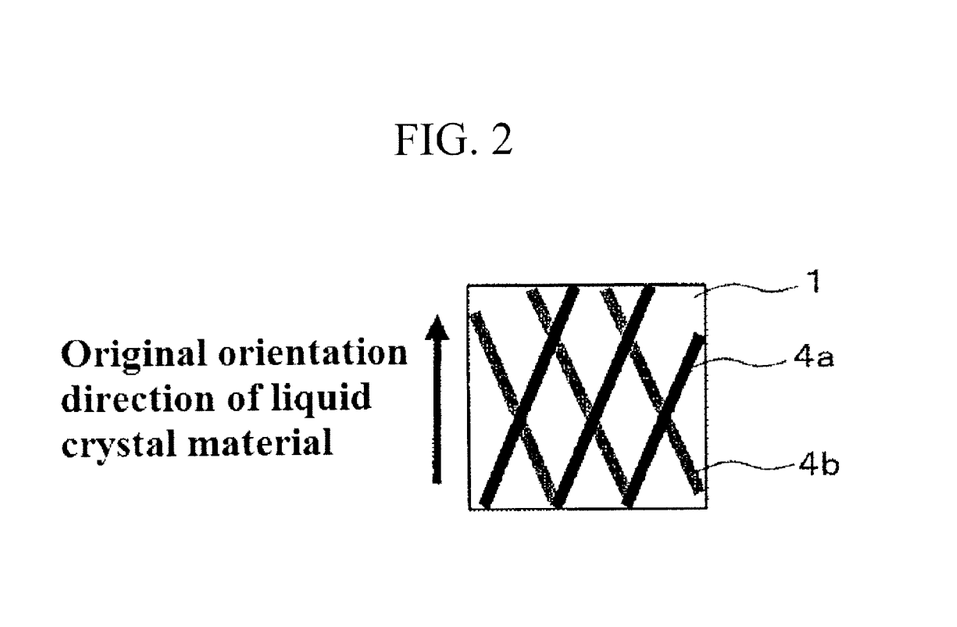
FIG. 2 is a view illustrating the correlation between the original orientation of liquid crystal material and a pair of comb electrodes formed on a substrate in the liquid crystal display device according to the first embodiment.

The electrode 4 on which the fixing film 5 is formed is not limited and may be selected from well-known electrodes to be generally used for liquid crystal display devices. For example, the electrode 4 may be a comb electrode made of ITO. In the case where a comb electrode is buried as the electrode 4 on the array substrate 1, as shown in FIG. 2, a pair of comb electrodes 4a and 4b are buried in a direction symmetrical to each other, based on the initial orientation direction of the liquid crystal material 3. More specifically, a voltage is applied to the comb electrode 4a, as the electrode at a temperature of Tg or higher, liquid crystal near the interface and the surfacial region of the polymer brush are rotated in an electric field direction, cooled to a temperature lower than Tg, subjected to memorization and heated to a temperature of Tg or higher again, and a voltage is applied to the comb electrode 4b, to render the liquid crystal near the interface and the surfacial region of the polymer brush to be oriented in the initial orientation direction.

That is, a pair of comb electrodes 4a and 4b are buried such that they are substantially symmetrical to each other, based on the initial orientation direction, enabling insertion and removal. Although not shown in FIG. 2, in the case where a pair of comb electrodes 4a and 4b is buried on one substrate, burying of the comb electrodes 4a and 4b is carried out by interposing an insulating film therebetween.

Figure 3:
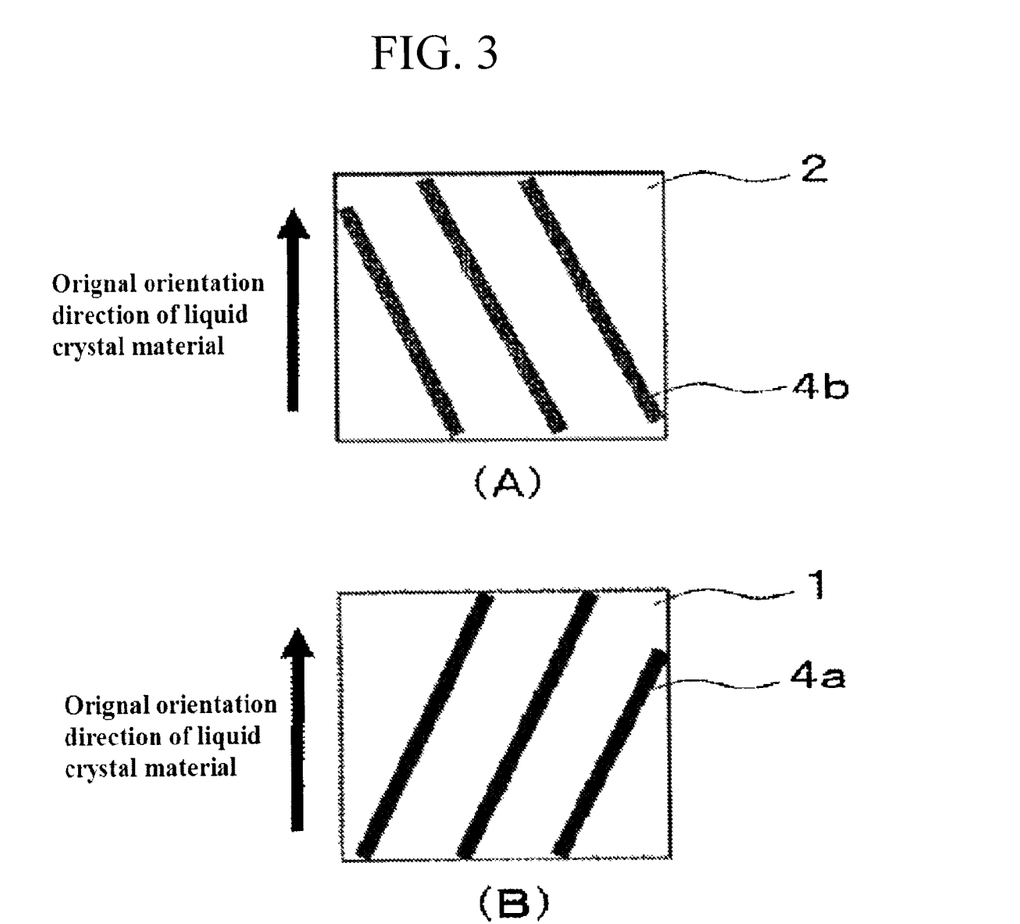
FIG. 3 is a view illustrating the correlation between the original orientation of liquid crystal material and a pair of comb electrodes formed on a substrate in the liquid crystal display device according to the first embodiment.

In addition, as shown in FIGS. 3(A) and 3(B), the paired comb electrodes 4a and 4b may be separately buried on the array substrate 1 and the opposite substrate 2, respectively. In this case, the comb electrodes 4a and 4b are also buried substantially symmetrical to each other, based on the initial orientation direction of the liquid crystal material 3.

The liquid crystal used for the liquid crystal material 3 is not particularly limited and may be selected from liquid crystal well-known to be generally used for liquid crystal display devices.

Hereinafter, a method of operating the liquid crystal display device according to the first embodiment of the present invention will be described.

The liquid crystal display device according to the first embodiment of the present invention is operated in a manner similar to known in-plane switching (IPS) mode liquid crystal display devices, at a temperature lower than a glass transition temperature (Tg) of a region of the polymer brush 6 (polymeric material), swollen by the liquid crystal material, to display moving and still images with image qualities comparable to common displays such as LCDs.

When the liquid crystal display device according to the first embodiment of the present invention displays an image, a voltage is applied to the electrode 4 at a temperature of Tg or higher, to vary the orientation of the surfacial region of the polymer brush and the liquid crystal material. Then, the liquid crystal display device is cooled to a temperature lower than Tg, to fix orientation of the surfacial region of the polymer brush (i.e., an image is memorized) and thus display memory image with high brightness, high CR and continuous gradation at a low voltage.

Temperature control (heating or cooling) is required so that the liquid crystal display device according to the first embodiment of the present invention can display a memory image. Accordingly, the liquid crystal display device is preferably provided with a temperature control unit. The temperature control unit is not particularly limited and examples thereof include lasers, heating electrodes, heat storage layers, sheet-type heaters, thermal heads and ovens.

In addition, the liquid crystal display device may be used as a rewritable paper without being integrated with a temperature control unit.

Regardless of the initial orientation direction (i.e., one axis direction or random) of the region of polymer brush 6 swollen by the liquid crystal material 3, when images are memorized or rewritten, a method wherein the entire surface of the panel is heated to a temperature of Tg or higher and a voltage is applied only to the pixel of the corresponding region may be adopted. Alternatively, a method wherein only the pixel of the corresponding region is heated to a temperature of Tg or higher using a laser or thermal head with a predetermined pixel size and a voltage is simultaneously applied to the entirety of the pixels may be adopted.

In the liquid crystal display device according to the first embodiment of the present invention wherein the initial orientation direction of the region of the polymer brush 6 swollen by the liquid crystal material 3 is one axis direction, when the memorized image returns to the original orientation state, a voltage is preferably applied to a comb electrode different from the comb electrode to which the voltage is applied, when the image is memorized at a temperature of Tg or higher (for example, since a voltage is applied to the comb electrode 4a, when an image is memorized, a voltage is applied to the comb electrode 4b so that the orientation can return to the original state).

In the liquid crystal display device according to the first embodiment of the present invention wherein the initial orientation direction of the region of polymer brush 6 swollen by the liquid crystal material 3 is random, when the memorized image returns to the original orientation direction, only the pixel present on the entire surface or corresponding region of the panel may be heated to a temperature of Tg or higher.

Next, a method of fabricating a liquid crystal display device according to the first embodiment of the present invention will be described. Furthermore, hereinafter, the first embodiment will be described as one example of injection of liquid crystal using a capillary phenomenon, but the first embodiment is not limited thereto and injection of liquid crystal using one drop filling (ODF) may alternatively be utilized.

First, an electrode 4 is formed on an array substrate 1 and an opposite substrate 2. The formation method of the electrode 4 is not limited and may be selected from well-known methods. Furthermore, the array substrate 1 may be washed prior to formation of the electrode 4, if necessary.

Then, a fixing film 5 is formed on the array substrate 1 and the opposite substrate 2 on which the electrode 4 is formed. The formation of the fixing film 5 is unnecessary, when adhesion between the array substrate 1 and the opposite substrate 2 provided with the electrode 4, and the polymer brush 6 is good. The formation method of the fixing film 5 is not limited and may be suitably determined depending on the materials used.

For example, the fixing film 5 can be formed by immersing the array substrate 1 and the opposite substrate 2 provided with the electrode 4 in a fixing film solution, followed by drying. In order to form the fixing film 5 in a predetermined region, a region where the fixing film 5 is not to be formed may be masked.

In addition, the opposite substrate 2 may be washed prior to formation of the fixing film 5, if necessary.

Then, a polymer brush 6 is formed on the array substrate 1 and opposite substrate provided with the fixing film 5. The formation of the polymer brush 6 is carried out using living radical polymerization (e.g., ATRP). For example, the formation of the polymer brush 6 is carried out by immersing the array substrate 1 and opposite substrate 2 provided with the fixing film 5 in a polymer brush solution comprising radical polymerization monomers, a polymerization initiator and a copper halide/ligand complex, followed by heating.

Here, heating conditions are not limited and may be suitably controlled depending on materials used. Generally, heating temperature is 60 to 150° C. and heating duration is 0.5 to 10 hours. At this time, the pressure is room temperature, but may be increased or reduced pressure. Furthermore, if necessary, the array substrate 1 and opposite substrate 2 provided with the fixing film 5 may be washed prior to formation of the polymer brush 6.

Then, the array substrate 1 and the opposite substrate 2 provided with the polymer brush 6 are joined together. For example, the array substrate 1 is joined to the opposite substrate 2 by applying a sealing material thereto, spraying a spacer, joining the array substrate 1 to the opposite substrate 2 and curing the sealing material.

Then, liquid crystal is injected between the array substrate 1 and the opposite substrate 2 using a capillary phenomenon, and an inlet is closed and sealed, when the injection of liquid crystal is completed.

Then, liquid crystal molecules are oriented in one axis direction by non-contact orientation such as magnetic field orientation. When magnetic field orientation is used, a magnetic field is applied in the desired direction in which liquid crystal molecules 7 are oriented, using a permanent magnet or a superconducting magnet, while the polymer brush 6 is heated to a glass transition temperature (Tg) or higher and then cooled to room temperature. The heating and magnetic field orientation enable non-contact orientation in one direction.

In addition, the polymer brush 6 is heated to a glass transition temperature (Tg) or higher and liquid crystal molecules may be delicately randomly oriented. Heating conditions may be suitably controlled depending on the glass transition temperature of the formed polymer brush 6. Generally, heating temperature is 60 to 150° C. and heating duration is 10 minutes to 1 hour.

Similarly, magnetic field application conditions may also be controlled depending on the type of liquid crystal used. Generally, magnetic flux density is 0.5 T to 5 T. In addition, a temperature elevation rate to room temperature is preferably 1° C./min to 20° C./min. When the temperature elevation rate is lower than 1° C./min, process period lengthens and is practically inapplicable. Meanwhile, when the temperature elevation rate exceeds 20° C./min, orientation control of liquid crystal molecules 7 is insufficient.

Meanwhile, although one axis orientation using a magnetic field has been described, orientation using rubbing treatment is possible, when the polymer brush 6 is used as an orientation film.

Second Embodiment

In a second embodiment, a case in which a coating film is used as a polymeric material to form an orientation film is described.

Figure 4:
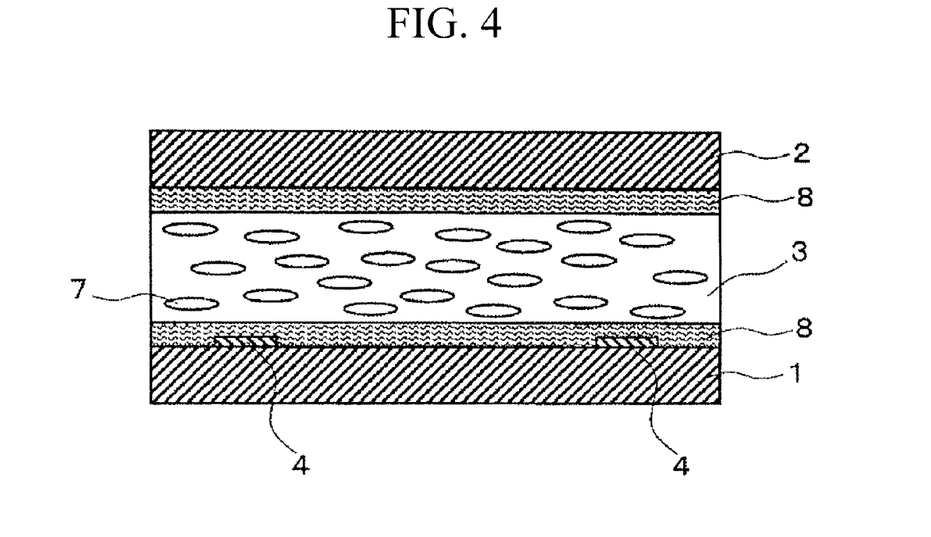
FIG. 4 is a schematic sectional view illustrating the liquid crystal display device according to a second embodiment of the present invention.

FIG. 4 is a schematic sectional view illustrating the liquid crystal display device according to the second embodiment of the present invention. As shown in FIG. 4, the liquid crystal display device includes an array substrate 1, an opposite substrate 2 which faces the array substrate 1 and a liquid crystal material 3 sealed between the array substrate 1 and the opposite substrate 2.

Also, an electrode 4 and a coating film 8 are formed on the array substrate 1 in this order. Also, the coating film 8 is formed on the opposite substrate 2.

The liquid crystal display device having the afore-mentioned configuration according to the second embodiment of the present invention basically has the same configuration as well-known liquid crystal display devices, except that the coating film 8 is formed as an orientation film. For example, the liquid crystal display device is formed in accordance with a well-known method comprising arranging an opposite substrate 2 which faces the array substrate 1 provided with the electrode 4 and injecting the liquid crystal material 3 between the array substrate 1 and the opposite substrate 2.

On the interface where the coating film 8 contacts the liquid crystal material 3, the surficial region of the coating film 8 is swollen by the liquid crystal material 3 and the glass transition temperature ($T_g$) of the coating film 8 is lower than its inherent level. As a result, the glass transition temperature ($T_g$) of this swollen region is lower than a temperature ($T_{NI}$) at which the liquid crystal material 3 undergoes phase transition from N phase to I phase.

Such a state can be accomplished by suitably varying the type of materials used for the coating film 8 and the type of liquid crystal used for the liquid crystal material 3.

In conventional LCDs, since the liquid crystal material is fixed by the orientation film, when voltage is applied to an electrode, liquid crystal near the interface between the orientation film and the liquid crystal material is fixed and bulk liquid crystal is oriented in an electric field direction (vertical direction to an electric field, when Δn is negative), and when an electric field is off, the orientation returns to the original state by elasticity.

In the liquid crystal display device according to the second embodiment of the present invention, since the swollen region of the coating film 8 as the orientation film has a glass transition temperature ($T_g$) lower than a temperature ($T_{NI}$) at which the liquid crystal material 3 undergoes phase transition from N phase to I phase, when heated to a temperature of $T_g$ or higher and a voltage is applied to the electrode, bulk liquid crystal and liquid crystal on the interface are oriented together with the surficial region of the coating film 8 in an electric field direction.

The thickness of the coating film 8 is about several tens of nanometers, more specifically, 10 nm to 100 nm, preferably 10 nm to 80 nm. This thickness is smaller than the thickness of conventional polyimide orientation films (generally, 100 nm), thus enabling the liquid crystal display device to be driven at a low voltage.

The coating film 8 can be formed by applying a polymeric material solution dissolved in a solvent to the array substrate 1 and the opposite substrate 2 provided with the electrode 4. The polymeric material used for the coating film 8 can be swollen by immersing the liquid crystal material 3 in water, is preferably not dissolved in the liquid crystal material 3 and for example is polymethyl methacrylate (PMMA). The polymeric material may be used alone or in combination thereof.

The molecular weight of polymeric material used for formation of the coating film 8 is not limited and is preferably a level at which the polymeric material is not dissolved in the liquid crystal.

The array substrate 1, the opposite substrate 2, the liquid crystal material 3 and the electrode 4 used for the second embodiment are the same as those of the first embodiment and a detailed explanation thereof is thus omitted. In addition, the electrode 4 may be buried, as shown in the first embodiment and a detailed explanation thereof is omitted.

In addition, the liquid crystal display device according to the second embodiment of the present invention is operated in the same manner as the first embodiment and a detailed explanation thereof is thus omitted.

Next, a method of fabricating the liquid crystal display device according to the second embodiment of the present invention will be described. Meanwhile, hereinafter, the second embodiment will be described as one example of injection of liquid crystal using a capillary phenomenon, but the second embodiment is not limited thereto and may utilize injection of liquid crystal using one drop filling (ODF).

First, an electrode 4 is formed on an array substrate 1. The formation method of the electrode 4 is not limited and may be selected from well-known methods. Furthermore, the array substrate 1 may be washed prior to formation of the electrode 4, if necessary.

Then, a polymeric material solution is applied as an orientation film on the array substrate 1 and the opposite substrate 2 provided with the electrode 4. The application method is not limited and may be suitably determined from methods such as press printing and ink jet printing.

Then, the array substrate 1 and the opposite substrate 2 provided with the polymer brush 6 are joined together. For example, the array substrate 1 is joined to the opposite substrate 2 by applying a sealing material thereto, spraying a spacer, joining the array substrate 1 to the opposite substrate 2 and curing the sealing material.

Then, liquid crystal is injected between the array substrate 1 and the opposite substrate 2 using a capillary phenomenon, and an inlet is closed and sealed, when the injection of liquid crystal is completed.

Then, liquid crystal molecules are oriented in one axis direction by non-contact orientation such as magnetic field orientation. When magnetic field orientation is used, a magnetic field is applied in the desired direction in which liquid crystal molecules (7) are oriented, using a permanent magnet or superconductive magnet, while the polymer brush 6 is heated to a glass transition temperature ($T_g$) or higher, and then cooled to room temperature. The heating and magnetic field orientation enable non-contact orientation in one direction. In addition, the polymer brush 6 is heated to a glass transition temperature ($T_g$) or higher and liquid crystal molecules 7 may be delicately randomly oriented. Heating conditions may be suitably controlled depending on the glass transition temperature of the formed polymer brush 6. Generally, heating temperature is 60 to 150° C. and heating duration is 10 minutes to 1 hour.

Similarly, magnetic field application conditions may also be controlled depending on the type of liquid crystal used. Generally, magnetic flux density is 0.5 T to 5 T. In addition, a temperature elevation rate to room temperature is preferably 1° C./min to 20° C./min. When the temperature elevation rate is lower than 1° C./min, process period lengthens and is practically inapplicable. Meanwhile, when the temperature elevation rate exceeds 20° C./min, orientation control of liquid crystal molecules 7 is insufficient.

Meanwhile, although one axis orientation using a magnetic field has been described, orientation using rubbing treatment is possible, when the coating film 8 is used as an orientation film.

In addition to the polymer brush 6 and the coating film 8 described in the first and second embodiments, a film in which the polymeric material dissolved or sprayed in the liquid crystal material 3 is adsorbed on the surface of the substrate may be used as the orientation film.

Hereinafter, the present invention will be described with reference to preferred embodiments to which the present invention is not limited thereto.

EXAMPLE 1

A glass substrate provided with pixel and common electrodes made of ITO and an opposite substrate provided with at least one photospacer with a height of 3 μm were prepared and a mask was formed in a region where a polymer brush is not formed. Then, two masked glass substrates were immersed in a fixing film solution comprising 38 g of ethanol, 2 g of ammonia water (28%), and 0.4 g of (2-bromo-2-methyl)propionyloxy hexyl triethoxysilane (BHE) at room temperature for one day, and dried to form a fixing film.

Then, two glass substrates provided with a fixing film were washed and dried, styrene (as a radical polymeric monomer), ethyl-2-bromo isobutylate (as a polymerization initiator), copper halide (CuBr) and 4,4'-dinonyl-2,2'-bipyridine (as a ligand compound) were immersed in a polymer brush solution at a molar ratio of 1000:1:12:24 and heated at 90° C. for 3 hours to perform living radical polymerization and thereby form a polymer brush (hereinafter, referred to as a "PMMA brush"). Then, the two glass substrates provided with the PMMA brush were washed and dried, and a mask was removed from the glass substrate.

The molecular weight of the formed PMMA brush was measured using a GPC measurement apparatus. Polymethyl methacrylate was used as a standard sample and a refraction index (ID) detector was used as a detector. As a result, the number avaerage molecular weight (Mn) of the PMMA brush was $1.12 \times 10^5$, and the molecular weight distribution (Mw/Mn) thereof was 1.17.

In addition, the thickness of a layer of PMMA brush (PMMA brush layer) was measured using an X-ray reflectivity meter. As a result, the thickness of the PMMA brush layer was 45.4 nm.

Furthermore, the graft density of the PMMA brush was evaluated. As a result, the number of chains per $nm^2$ of the glass surface was 0.29.

Then, a sealing material was applied to one surface of the glass substrate provided with the PMMA brush, two glass substrates were joined together, and the sealing material was heated under a nitrogen atmosphere at 120° C. for 2 hours and cured. P-type liquid crystal was injected between the two glass substrates using a capillary phenomenon and sealed by closing the inlet when the injection of liquid crystal was completed. The substrates were heated at a temperature of 120° C. for 20 minutes, while a 1 T magnetic field was applied in a predetermined direction, and then cooled to room temperature at a temperature drop rate of 3° C./min, while a magnetic field was applied thereto, to obtain a liquid crystal display device.

EXAMPLE 2

A glass substrate provided with pixel and common electrodes made of ITO and an opposite substrate provided with at least one photospacer with a height of 3 μm were prepared, a polymeric material comprising polymethylmethacrylate (weight average molecular weight of 120,000) dissolved as an etchant was coated on the glass substrate using a spin coater and heated at 55° C. for 120 seconds, the solvent was dried, and the resulting structure was heated at 100° C. for 15 minutes in order to improve adhesion to the substrate to form a coating film (hereinafter, referred to as a "PMMA coating film").

Then, a sealing material was applied to one surface of the glass substrate provided with the PMMA brush, two glass substrates were joined together, and the sealing material was heated under a nitrogen atmosphere at 120° C. for 2 hours and cured. P-type liquid crystal ($T_{NI}$: 112° C.) was injected between the two glass substrates using a capillary phenomenon and sealed by closing the inlet, when the injection of liquid crystal was completed. The substrates were heated at a temperature of 120° C. for 20 minutes, while a 1 T magnetic field was applied in a predetermined direction, and was then cooled to room temperature at a temperature drop rate of 3° C./min, while a magnetic field was applied thereto, to obtain a liquid crystal display device.

COMPARATIVE EXAMPLE 1

In Comparative Example 1, a conventional liquid crystal display device provided with a rubbing orientation film was fabricated.

A liquid crystal display device was obtained in the same manner as in Example 1, except that a polyimide film was formed on a glass substrate provided with pixel and common electrodes made of ITO and an opposite substrate provided with at least one photospacer with a height of 3 μm and was then rubbed to form a rubbing orientation film. Meanwhile, the thickness of the rubbing orientation film was about 100 nm.

(Evaluation of Orientation Control)

Figure 5:
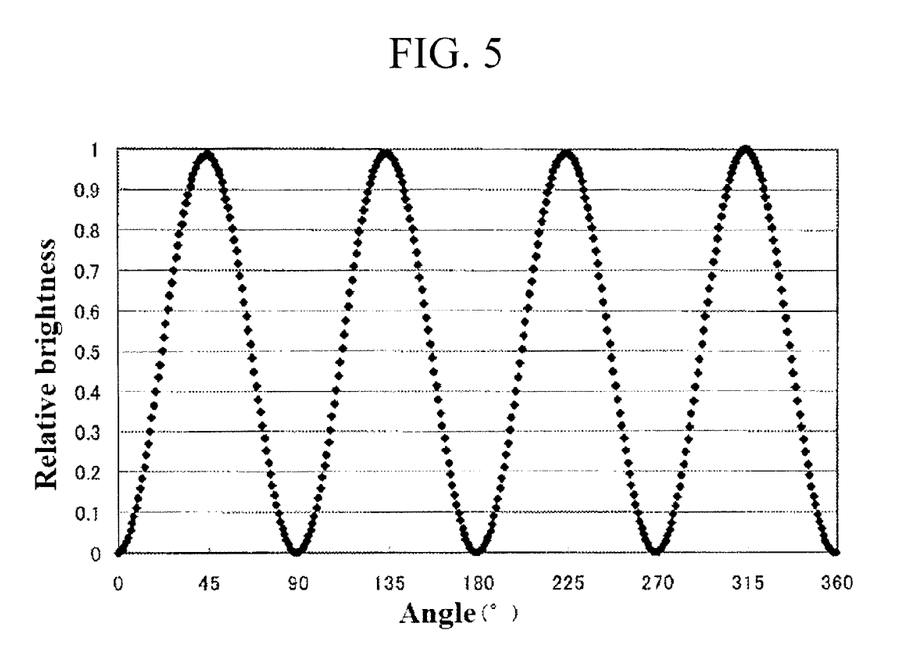
FIG. 5 is a graph showing correlation between rotation angle and relative brightness in the liquid crystal display device of the first embodiment.

A polarizer was formed in a cross nicol state on both sides of the liquid crystal display device obtained in Example 1, the liquid crystal display device rotates between the polarizer, and correlation between rotation angle and permeability of the liquid crystal display device was evaluated using an LCD analyzer. The results thus obtained are shown in FIG. 5. Meanwhile, the panel was set on the measurement apparatus to initiate measurement such that the permeation axis of the polarizer upon which light is incident extends in the orientation direction of the liquid crystal (i.e., application direction of magnetic field).

As can be seen from FIG. 5, the liquid crystal display device exhibits periodic light extinction at an interval of 90 degrees and liquid crystal present therein is oriented in one axis direction parallel to the glass substrate, which means that the PMMA brush layer serves as an orientation film for liquid crystal.

In addition, the liquid crystal display device obtained in Example 1 was heated at a temperature of 85° C., $V_{15}$ (a voltage at which 15% of maximum permeability can be obtained, 4V in the case of Example 1) was applied for 7,200 seconds, the liquid crystal display device was cooled to 25° C. and the correlation between rotation angle and permeability of the liquid crystal display device was evaluated using an LCD analyzer. The results thus obtained are shown in FIG. 6.

Figure 6:
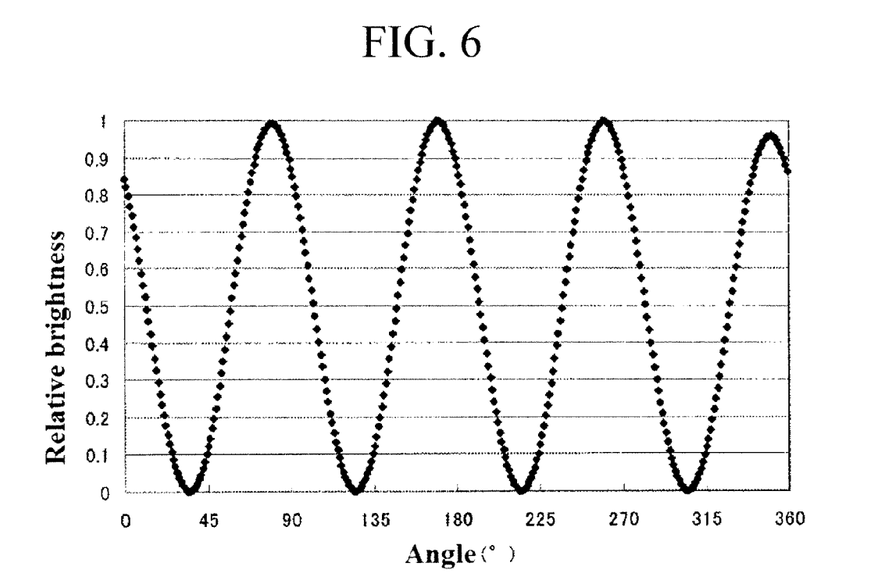
FIG. 6 is a graph showing correlation between rotation angle and relative brightness in the liquid crystal display device of the first embodiment.

As can be seen from FIG. 6, in this liquid crystal display device, liquid crystal is oriented in one direction at the position which forms an angle of about 35 degrees with an initial orientation direction. From this result, it can be seen that the entirety of liquid crystal (bulk liquid crystal as well as liquid crystal near the interface) rotates about 35 degrees.

Figure 7:
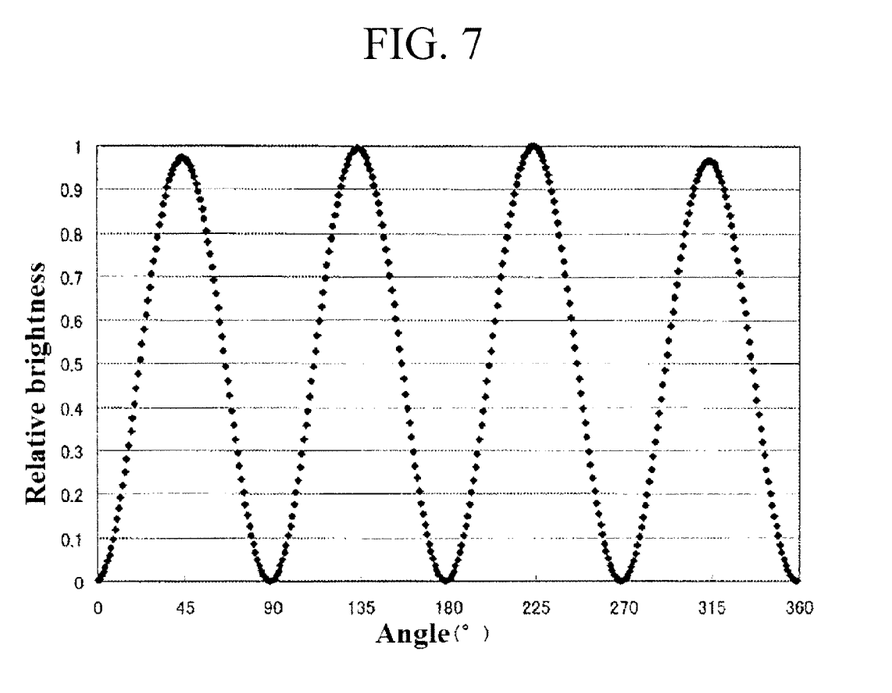
FIG. 7 is a graph showing correlation between rotation angle and relative brightness in the liquid crystal display device of the second embodiment.

In addition, the correlation between rotation angle and permeability of the liquid crystal display device obtained in Example 2 was evaluated. The results thus obtained are shown in FIG. 7. As can be seen from FIG. 7, this liquid crystal display device also exhibits periodic light extinction at an interval of 90 degrees, and liquid crystal present therein is oriented in one axis direction parallel to the glass substrate, which means that the PMMA coating film serves as an orientation film for liquid crystal.

In addition, the liquid crystal display device obtained in Example 2 was heated at a temperature of 85° C., $V_{15}$ (a voltage in which 15% of maximum permeability can be obtained, 3.6V in the case of Example 2) was applied for 7,200 seconds, the liquid crystal display device was cooled to 25° C., and the correlation between rotation angle and permeability of the liquid crystal display device was evaluated using an LCD analyzer. The results thus obtained are shown in FIG. 8.

Figure 8:
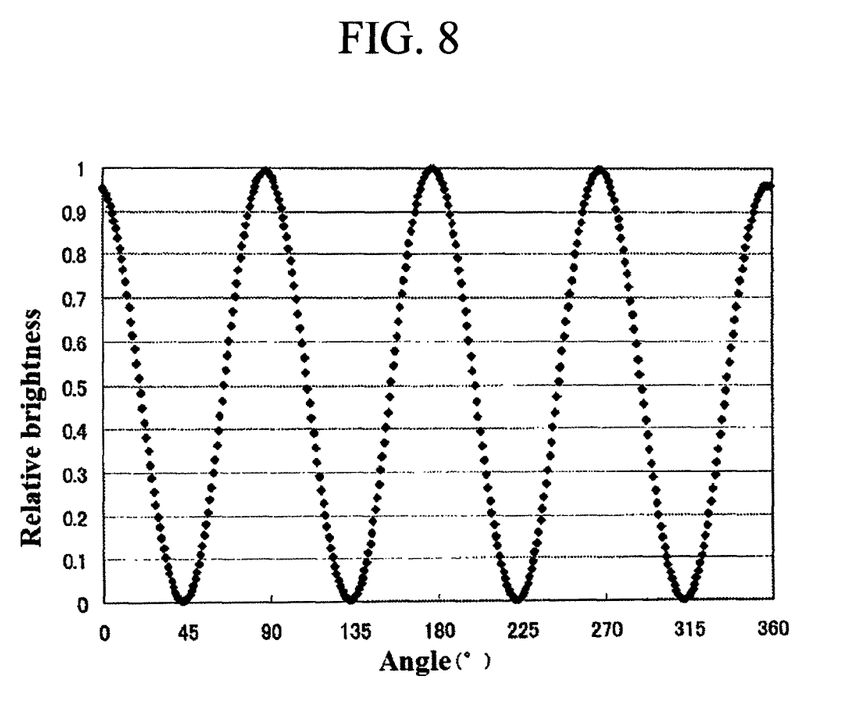
FIG. 8 is a graph showing correlation between rotation angle and relative brightness in the liquid crystal display device of the second embodiment.

As can be seen from FIG. 8, in this liquid crystal display device, liquid crystal is oriented in one direction at the position which forms an angle of about 42 degrees with the initial orientation direction. From this result, it can be seen that the entity of liquid crystal (bulk liquid crystal as well as liquid crystal near the interface) rotates about 42 degrees.

(Evaluation of V-T Curve)

A polarizer was formed in a cross nicol state on both sides of the liquid crystal display device obtained in Example 1, Example 2 and Comparative Example 1, a varied voltage was applied to the liquid crystal display device, and permeability was measured. Meanwhile, the panel was set on the measurement apparatus to initiate measurement such that the permeation axis of the polarizer upon which light is incident extends in the orientation direction of liquid crystal (i.e., application direction of magnetic field in Example 1 and rubbing direction in Comparative Example 1). The results thus obtained are shown in FIG. 9.

Figure 9:
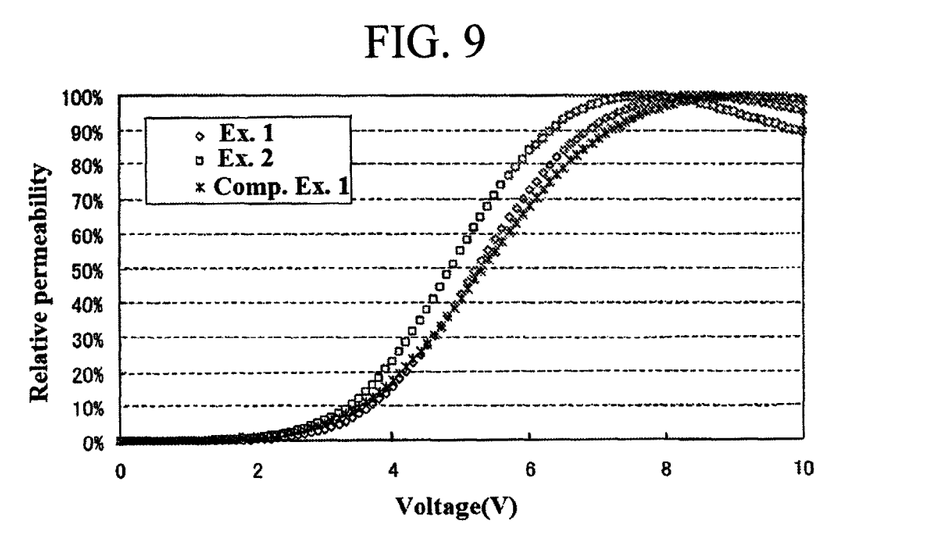
FIG. 9 is a graph showing V-T curves of the liquid crystal display devices obtained in Example 1, Example 2 and Comparative Example 1.

As can be seen from FIG. 9, in the liquid crystal display device of Example 1, $V_{max}$ was 8.5V, and in the liquid crystal display device of Example 2, $V_{max}$ was 7.8V, while, in the liquid crystal display device of Comparative Example 1, $V_{max}$ was 9.1V. That is, in the liquid crystal display device of Examples 1 and 2, the V-T curve shifts to a low voltage and driving voltage is decreased, as compared to the liquid crystal display device of Comparative Example 1.

(Evaluation of Response Speed)

A polarizer was formed in a cross nicol state on both sides of the liquid crystal display device obtained in Example 1, Example 2 and Comparative Example 1, $V_{max}$ (60 Hz of alternating current) was applied to the liquid crystal display device for 100 milliseconds, and response speed (τon/τoff) was measured at 25° C. using an LCD-5200. The results are shown in FIG. 10.

Figure 10:
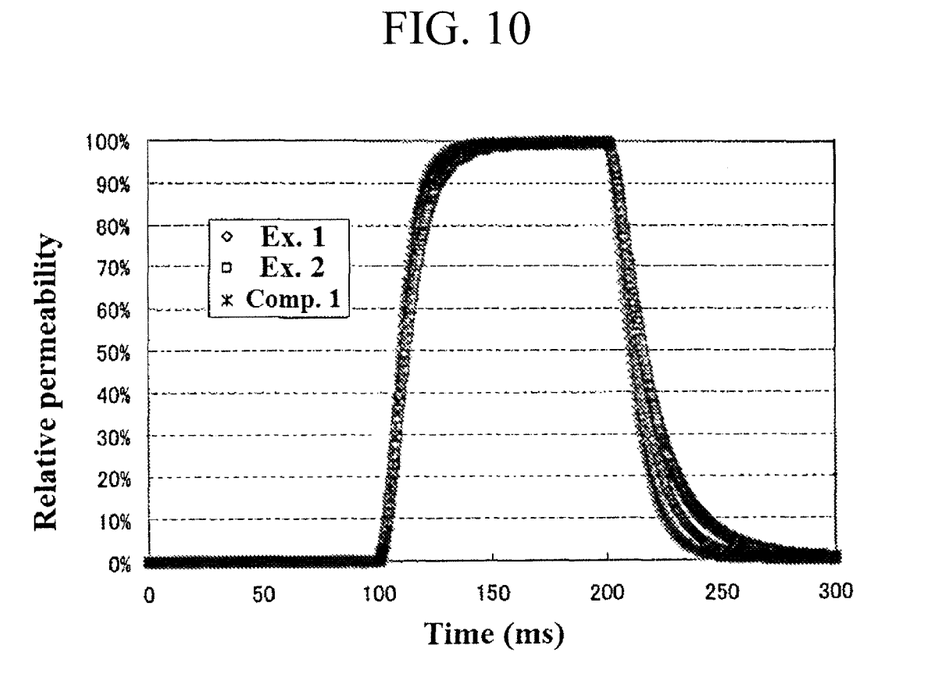
FIG. 10 is a graph showing response speed of the liquid crystal display devices obtained in Example 1, Example 2 and Comparative Example 1.

As can be seen from FIG. 10, the liquid crystal display devices of Examples 1 and 2 have superior anchoring property, comparable to Comparative Example 1. In addition, in the liquid crystal display device of Example 1, τon (10%=>90%) was 17.3 milliseconds and τoff (90%=>10%) was 27.6 milliseconds. In the liquid crystal display device of Example 2, τon (10%=>90%) was 22.2 milliseconds, and τoff (90%=>10%) was 37.2 milliseconds, while, in the liquid crystal display device of Comparative Example 1, τon (10%=>90%) was 16.8 milliseconds, and τoff (90%=>10%) was 22.4 milliseconds. As such, it can be seen that the liquid crystal display devices of Examples 1 and 2 have a response speed suitable for display of moving images.

(Permeability During Operation)

A polarizer was formed in a cross nicol state on both sides of the liquid crystal display devices obtained in Example 1, Example 2 and Comparative Example 1, while the temperature was varied to 25° C., 45° C., 65° C. and 85° C., $V_{max}$ (60 Hz of alternating current) was applied to the liquid crystal display device for 10,000 seconds, the voltage was off and the liquid crystal display device was stood for 20,000 seconds. Variation in permeability was measured using an LCD-5200. The results for Examples 1 and Comparative Example 1 are shown in FIG. 11 and the results for Example 2 are shown in FIG. 12.

Figure 11:
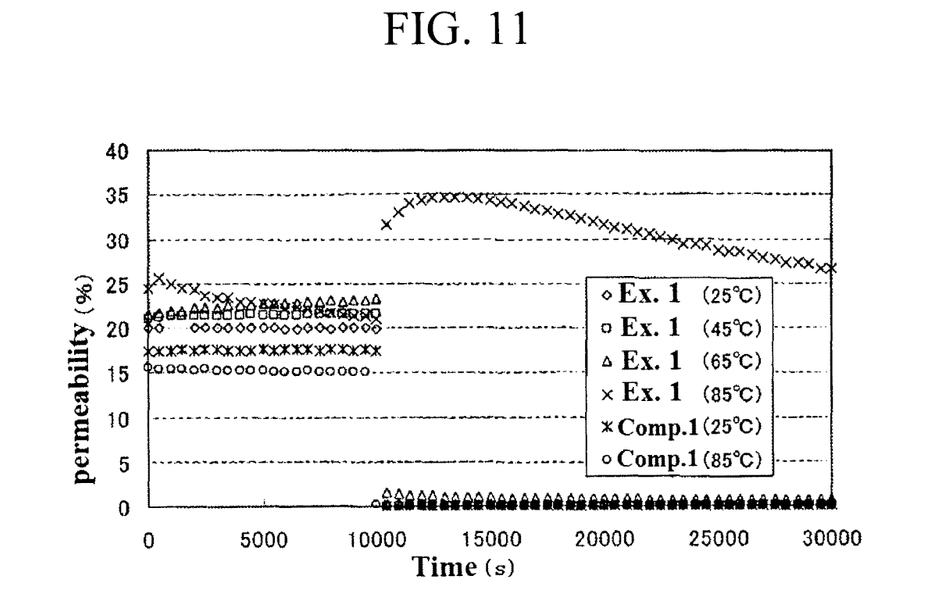
FIG. 11 is a graph showing correlation between voltage application period and permeability in the liquid crystal display devices obtained in Example 1 and Comparative Example 1.

As can be seen from FIG. 11, the liquid crystal display device of Example 1 exhibited the same behaviors as the liquid crystal display device of Comparative Example 1 wherein permeability was constant at 25° C. and 45° C., when a voltage was applied thereto, and permeability immediately after the voltage was off returns to the permeability prior to voltage application. The anchoring properties that the liquid crystal display device of Example 1 exhibits at a temperature of at least 45° C. or lower are stable for a long period of time, and are comparable to the liquid crystal display device of Comparative Example 1. Variation in permeability was observed at a 65° C. or higher. From this result, it can be seen that the surfacial region of PMMA brush (a part swollen by the liquid crystal) has a glass transition temperature ranging from 45° C. to 65° C.

In addition, at 85° C. in the range from 0 to 10,000 seconds, liquid crystal present near the interface and bulk liquid crystal are tortioned and the surfacial region of PMMA brush rotates, and bulk liquid crystal shifts to the interface position (torsion is removed) immediately after the voltage is shut off, is oriented in one direction and returns to the initial orientation, while maintaining the one axis direction.

Figure 12:
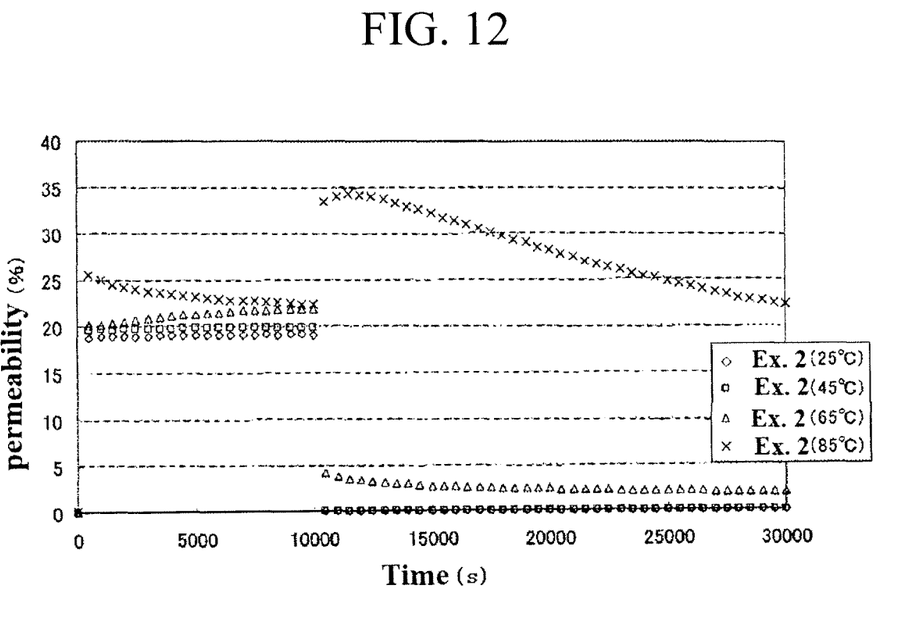
FIG. 12 is a graph showing correlation between voltage application period and permeability in the liquid crystal display device obtained in Example 2.

In addition, as can be seen from FIG. 12, the liquid crystal display device of Example 2 also exhibits stable anchoring property at 45° C. or lower for a long period of time and undergoes variation in permeability at 65° C. or higher. From these results, it can be seen that the surfacial region of the PMMA coating film (region swollen by liquid crystal) has a glass transition temperature of 45° C. to 65° C.

In addition, at 85° C. in the range from 0 to 10,000 seconds, liquid crystal present near the interface and bulk liquid crystal are tortioned, and the surfacial region of PMMA brush rotates, and bulk liquid crystal shifts to the interface position (tortion is released) immediately after the voltage is shut off, is oriented in one direction and returns to the initial orientation, while maintaining the one axis direction.

Then, a polarizer was formed in a cross nicol state on both sides of the liquid crystal display device obtained in Examples 1 and 2, the device was heated at a temperature of 85° C., $V_{15}$ (a voltage in which 15% of maximum permeability can be obtained, 4V in the case of Example 1 and 3.6V in the case of Example 2) was applied for 7,200 seconds, cooled to 25° C. and stood at 25° C. for 9,000 seconds without applying a voltage thereto. During this process, variation in permeability was measured using an LCD 5200. The result of the case in which $V_{15}$ is applied at 85° C. is shown in FIG. 13 and the result of the case in which a voltage is not applied after cooling to 25° C. is shown in FIG. 14.

Figure 13:
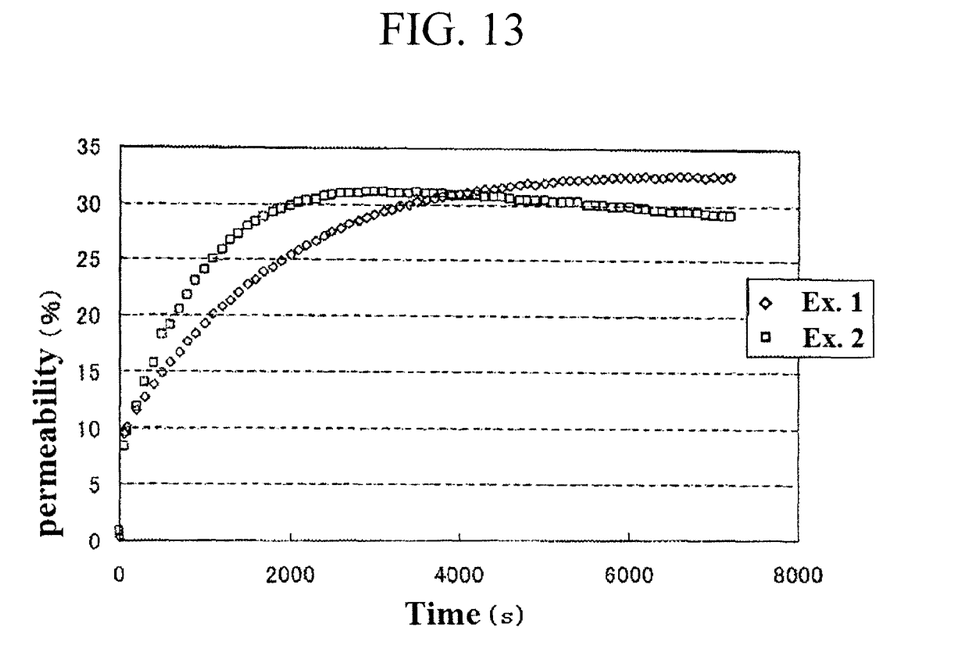
FIG. 13 is a graph showing variation in permeability, when $V_{15}$ (a voltage in which 15% of maximum permeability can be obtained) is applied at 85° C., in the liquid crystal display devices obtained in Examples 1 and 2.

As can be seen from FIG. 13, the liquid crystal display device of Example 1 exhibited an about 10% increase in permeability immediately after voltage is applied and then after a gradual increase in permeability up to 33% with time. In addition, the liquid crystal display device of Example 1 exhibited an about 8.5% increase in permeability immediately after a voltage is applied and then a gradual increase up to 30% and a decrease to about 29% in permeability with time. The liquid crystal display device of Examples 1 and 2 exhibited permeability of about 3%, when $V_{15}$ was applied at a temperature lower than 45° C. (about 15% of permeability maximum). Considering the fact that the permeability is about 20%, when a voltage which imparts maximum permeability to the liquid crystal display device of Comparative Example 1 is applied, the mechanism wherein the permeability is realized when $V_{15}$ is applied at 85° C. to the liquid crystal display device of Examples 1 and 2 can be understood.

Figure 14:
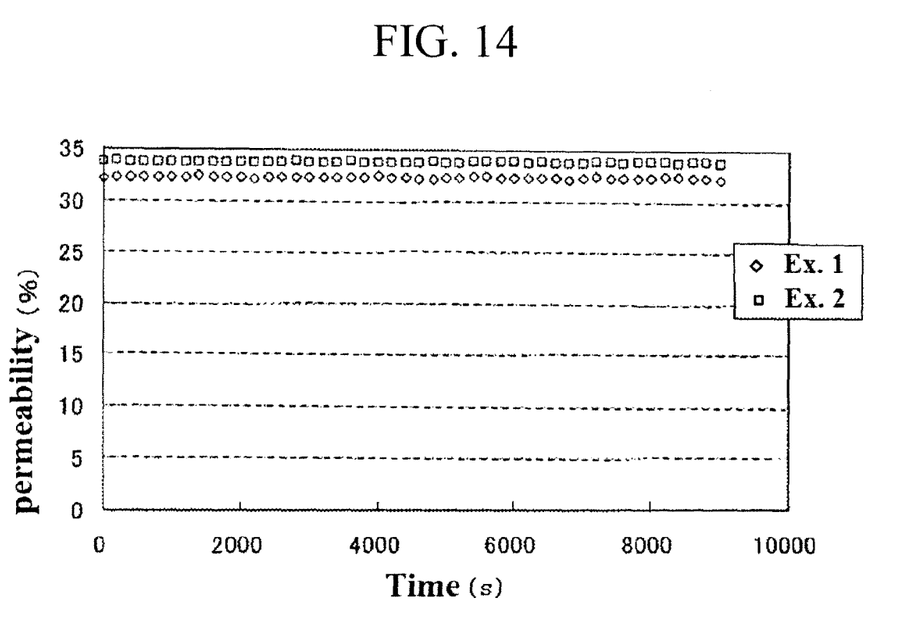
FIG. 14 is a graph showing variation in permeability, when $V_{15}$ (a voltage in which 15% of maximum permeability can be obtained) is applied at 85° C. and then cooled to 25° C. in the liquid crystal display devices obtained in Examples 1 and 2.

In addition, as can be seen from FIG. 14, while $V_{15}$ was applied at 85° C. and the LCD was then cooled at 25° C., the permeability of the liquid crystal display devices of Examples 1 and 2 was maintained at the level prior to cooling. Meanwhile, even after one month, the memory image was completely maintained.

The liquid crystal display devices of Examples 1 and 2 can exhibit low voltage, high permeability and memory capability, thus realizing considerably low power consumption, as compared to conventional liquid crystal display devices.

Advantageously, the liquid crystal display device and the method for operating the same according to the present invention can display moving and still images with superior image qualities, comparable to common LCDs, and can display memory images by a voltage lower than conventional electronic paper.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   first and second substrates facing each other;
   a pair of electrodes on at least one of the first and second substrates;
   first and second fixing films on the first and second substrates;
   first and second polymer brushes on the first and second fixing films, each of the first and second polymer brushes being a graft polymer chain, one end of which is covalently bonded to the surface of the substrate;
   a liquid crystal material between the first and second polymer brushes,
   wherein the liquid crystal display device displays an image by varying an orientation of the liquid crystal material and a surfacial region of the first and second polymer brushes, depending on temperature and voltage.

2. The liquid crystal display device according to claim 1, wherein the graft polymer chain has a structure in which forms like thread clumps are contracted, when graft density decreases.

3. The liquid crystal display device according to claim 1, wherein the surfacial region of the first and second polymer brushes is swollen by the liquid crystal material and a glass transition temperature ($T_g$) of the swollen surfacial region of the first and second polymer brushes is lower than a temperature ($T_{NI}$) at which the liquid crystal material undergoes phase transition from N phase to I phase.

4. The liquid crystal display device according to claim 3, wherein an initial orientation direction of the swollen surfacial region of the first and second polymer brushes is one axis direction.

5. The liquid crystal display device according to claim 3, wherein an initial orientation direction of the swollen surfacial region of the first and second polymer brushes is random.

6. The liquid crystal display device according to claim 1, wherein the graft polymer chain extends vertical to the surface of the substrate due to interaction (steric repulsion) of adjacent graft polymer chains, when graft density increases.

7. The liquid crystal display device according to claim 1, wherein the pair of electrodes are comb electrodes such that the comb electrodes are symmetrical to each other, based on the initial orientation of the liquid crystal material.

8. The liquid crystal display device according to claim 7, wherein the paired comb electrodes are separately buried in the first and second substrates, respectively.

9. The liquid crystal display device according to claim 7, wherein the comb electrodes are buried by interposing an insulating film on only one side of at least one of the first and second substrates.

10. The liquid crystal display device according to claim 1, further comprising a temperature control unit.

11. A method for operating a liquid crystal display device including a pair of electrode substrates, an orientation film of a polymer material on the pair of electrode substrates, and a liquid crystal material between the pair of electrode substrates, wherein a surfacial region of the orientation film is swollen by the liquid crystal material and a glass transition temperature ($T_g$) of the swollen surfacial region is lower than a temperature ($T_{NI}$) at which the liquid crystal material undergoes phase transition from N phase to I phase, the method comprising:
applying a voltage to an electrode in the electrode substrates at a temperature of $T_g$ or higher to vary orientation of the liquid crystal material and the surfacial region of the orientation film; and
cooling the device to a temperature lower than $T_g$ to fix the orientation of the surfacial region of the orientation film.

12. The method according to claim 11, further comprising:
returning the varied orientation of the surfacial region of the orientation film to one axis direction by applying a voltage to the electrode at a temperature of $T_g$ or higher, when an initial orientation direction of the swollen surfacial region of the orientation film is one axis direction.

13. The method according to claim 11, further comprising:
returning the varied orientation of the surfacial region of the orientation film to a random state by heating the orientation film to a temperature of $T_g$ or higher, when an initial orientation direction of the swollen surficial region of orientation film is random.

14. A liquid crystal display device, comprising:
first and second substrates facing each other;
a pair of electrodes on at least one of the first and second substrates;
first and second coating films on the first and second substrates;
a liquid crystal material between the first and second coating films,
wherein the liquid crystal display device displays an image by varing an orientation of the liquid crystal material and a surfacial region of the first and second coating films, depending on temperature and voltage; and
wherein the surfacial region of the first and second coating films is swollen by the liquid crystal material and a glass transition temperature ($T_g$) of the swollen surfacial region of the first and second coating films is lower than a temperature ($T_{NI}$) at which the liquid crystal material undergoes phase transistion from N phase to I phase.

15. The liquid crystal display device according to claim 14, wherein an initial orientation direction of the swollen surfacial region of the first and second coating films is one axis direction.

16. The liquid crystal display device according to claim 14, wherein an initial orientation direction of the swollen surfacial region of the first and second coating films is random.

17. The liquid crystal display device according to claim 14, wherein the pair of electrodes are comb electrodes such that the comb electrodes are symmetrical to each other, based on the initial orientation of the liquid crystal material.

18. The liquid crystal display device according to claim 17, wherein the paired comb electrodes are separately buried in the first and second substrates, respectively.

19. The liquid crystal display device according to claim 7, wherein the comb electrodes are buried by interposing an insulating film on only one side of at least one of the first and second substrates.

20. The liquid crystal display device according to claim 14, further comprising a temperature control unit.

* * * * *